United States Patent [19]

DeLuca et al.

[11] Patent Number: 4,952,929

[45] Date of Patent: Aug. 28, 1990

[54] SELECTIVE CALL RECEIVING SYSTEM

[75] Inventors: Michael J. DeLuca, Boca Raton; Courtney S. G. Henry, Coconut Creek, both of Fla.

[73] Assignee: Motorola, Inc., Schaumburg, Ill.

[21] Appl. No.: 342,767

[22] Filed: Apr. 17, 1989

[51] Int. Cl.[5] .............................................. H04Q 7/00

[52] U.S. Cl. .......................... 340/825.440; 340/311.1; 455/345

[58] Field of Search ........... 340/825.44, 311.1, 825.26, 340/825.45, 825.46, 825.47, 825.48, 825.3, 825.34, 825.54, 825.55, 825.44, 311.1; 455/171, 181, 132, 133, 345, 74, 351, 186, 11, 31, 133, 345; 364/200 MS File, 900 MS File; 379/57, 59

[56] References Cited

U.S. PATENT DOCUMENTS

| | | | |
|---|---|---|---|
| 3,955,140 | 5/1976 | Stephens et al. | 455/11 |
| 4,348,744 | 9/1982 | White | 340/825.3 |
| 4,354,252 | 10/1982 | Lamb et al. | 364/900 |
| 4,383,257 | 5/1983 | Giallanza et al. | 340/825.47 |
| 4,688,034 | 8/1987 | de Graaf | 340/825.48 |
| 4,803,487 | 2/1989 | Willard et al. | 340/825.44 |
| 4,906,989 | 3/1990 | Kasugai | 340/825.44 |

*Primary Examiner*—Donald J. Yusko
*Assistant Examiner*—Peter Weissman
*Attorney, Agent, or Firm*—Vincent B. Ingrassia; Anthony J. Sarli, Jr.

[57] ABSTRACT

A selective call radio receiving system includes first and second receiving means (10 and 10') each having a memory (20 and 20') therein. Paging messages are received by both the first and second receiving means in accordance with their message receiving capabilities, including factors such as: range, memory size, and position relative to the radio frequency transmitter. The contents of the first and second memories (20, 20') are periodically compared (16 or 16') to determine whether a paging message has been missed. In this way, an individual has the best opportunity to receive each paging message transmitted to him.

18 Claims, 4 Drawing Sheets

SELECTIVE CALL RECEIVING SYSTEM

BACKGROUND OF THE INVENTION

This invention relates generally to radio frequency receivers, and more particularly, to a selective call radio paging system.

Radio frequency pagers find wide use in contemporary society. Regretably, pagers sometimes fail to receive a paging message in those circumstances where the individual wearing the pager enters an area beyond the transmission range of the message, or an area that is temporarily "shadowed" so as to be unable to receive the transmitted message. Also, for those individuals receiving several messages, it is possible in some paging models to exceed the memory capacity of the radio pagers so as to be unable to receive further paging messages.

For physicians and other emergency personnel, failure to respond to a paging message may result in catastrophic circumstances. More generally, delayed response due to failed reception of a paging message tends to frustrate and delay business action resulting in loss of income and business opportunity. Accordingly, a need exists in the art to provide a more reliable system to receive paging messages.

BRIEF SUMMARY OF THE INVENTION

It is an object of the present invention to provide an improved selective call radio receiving system that overcomes the detriments of the prior art.

Briefly, according to the invention, a selective call radio receiving system includes first and second receiving means each having a memory therein. Paging messages are received by both the first and second receiving means in accordance with their message receiving capabilities, including factors such as: range, memory size, and position relative to the radio frequency transmitter.

According to the invention, the contents of the first and second memories are periodically compared to determine whether a paging message has been missed. In this way, an individual has the best opportunity to receive each paging message transmitted to him.

DESCRIPTION OF THE PREFERRED EMBODIMENT

Figure 1:
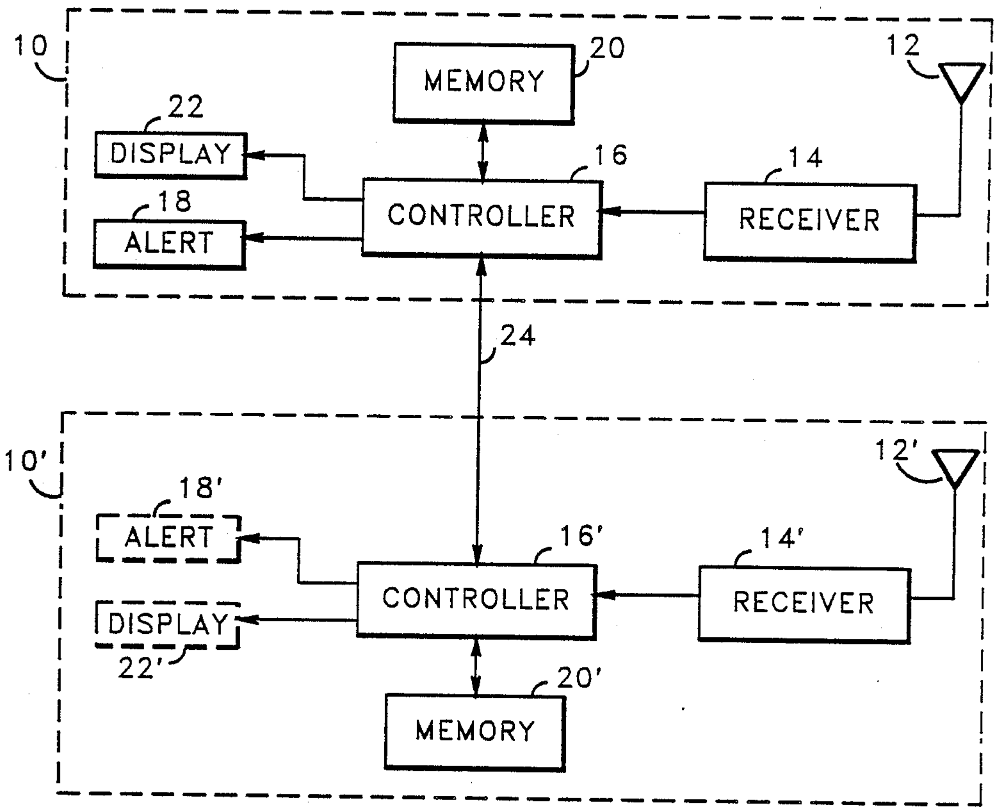
FIG. 1 is a block diagram of a selective call radio frequency receiving system in accordance with the present invention.

Referring to FIG. 1 there is shown a block diagram of the inventive selective call radio receiving system. A first selective call radio receive 10 comprises antenna 12 coupled to receiver 14. The output of receiver 14 is applied to a controller 16, which communicates with alert generating apparatus 18, memory 20, and display 22.

Receiver 10 operates as a portable paging device. That is, receiver 10 is assigned a unique address code, which is stored in the controller 16 or the memory 20. When a transmitted message is received at antenna 12 and applied to the receiver 14, the Controller 16, compares the address of the received message with the address code of the receiver 10. If a match occurs, the message is stored in the memory 20 and may be displayed on display 22 after the user is alerted by means of alert mechanism 18. Alert mechanism 18 may comprise, for example, an audible or tactile alarm.

A second receiver 10′ includes antenna 12′, receiver 14′, controller 16′, memory 20′, and optionally may include an alert generating mechanism 18′ and display 22′. As was the case with receiver 10, a transmitted message is received at antenna 12′ and applied to receiver 14′. Controller 16′ receives the demodulated signal and compares the received address with the address code of the receiver The invention contemplates that the receiver 10′ has a substantially better message receiving capability and/or greater memory capacity. Receiver 10′ may be a stationary printer/charger, or may be incorporated into an automobile or other vehicle. Due to its greater sensitivity and/or higher memory capacity, receiver 10′ has a much lower probability of missing pages than that of receiver 10 which is of a portable nature.

Figure 2:
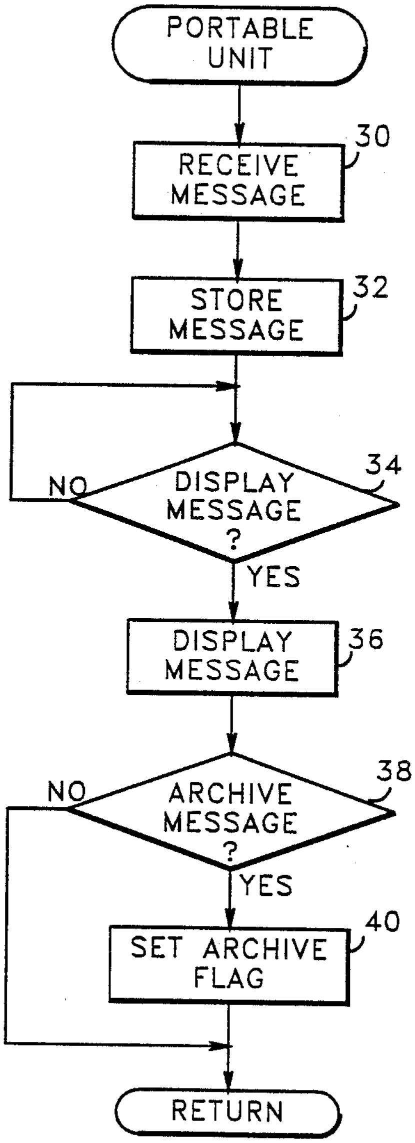
FIGS. 2 and 3 are flow diagrams illustrating the steps executed by the portable unit of FIG. 1.

The user of the portable receiver may desire to have a received message archived in the larger memory associated with the stationary receiver. To do this, the receiver 10 must first mark the message via the procedures set forth in the flow diagram of FIG. 2. That is, the portable receiver 10 receives and stores a message as is shown at steps 30 and 32. If desired, the message may be displayed on the display 18 of the portable device as is shown at 34 and 36 of the flowchart. The user may now decide if the message should be archived as is shown at 38, and if so, sets an archive flag, which is associated with the message in question as is shown at step 40. This may be done using conventional manual controls on the portable pager (i.e., an "Archive pushbutton"). If the user determines that archiving is not necessary, the portable unit continues to operate in its traditional manner.

Figure 3:
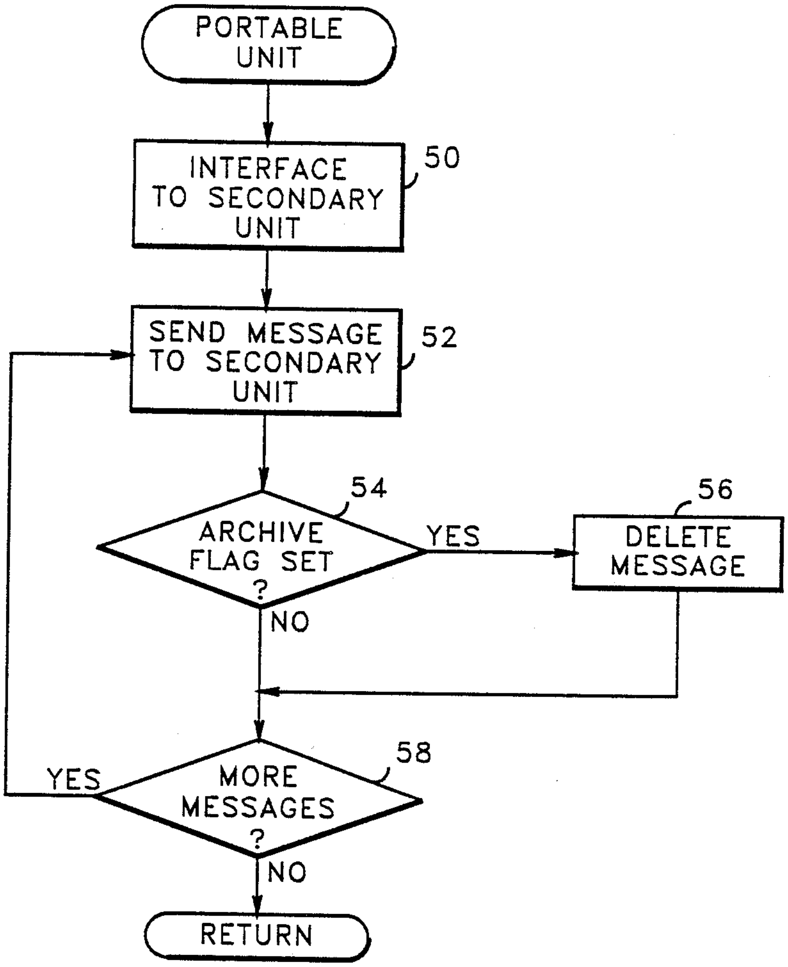

FIG. 3 is a flow diagram illustrating how messages to be archived are transferred to the memory of the secondary (stationary) receiver. The portable unit 10 is first interfaced with the secondary or stationary unit as shown at 50. The interface may be a serial data interfaced as is commonly used to interface the Motorola Bravo Display pager to its respective code plug programmer. The message is then transmitted (transferred) to the secondary unit, which searches for the archive flag (bit) as is shown at 52 and 54. If the flag (bit) is set, the message will be stored in the memory 20′ of the stationary unit 10′ as will be described in connection with FIG. 4, and the message will be automatically deleted from the memory 20 of the portable unit 10 as is shown at 56 in FIG. 3. This process will continue for each message until all messages have been interrogated.

Assuming that a user of the inventive selective call receiving system has incorporated into his vehicle a secondary (stationary) receiver 10′ and wears on his person a portable receiver 10, it is not unlikely that portable receiver 10 will miss pages transmitted to the user when the user has left his vehicle. Due to its greater sensitivity, however, it is also highly probable that the pages missed by receiver 10 will be received and stored in the memory 20′ of stationary receiver 10′. Upon the return of the user to his automobile the user may couple portable receiver 10 to stationary receiver 10′ (via the interface 24) which results in a comparison of the messages received by each receiver. This is accomplished in accordance with the procedures set forth in FIG. 4.

Figure 4:
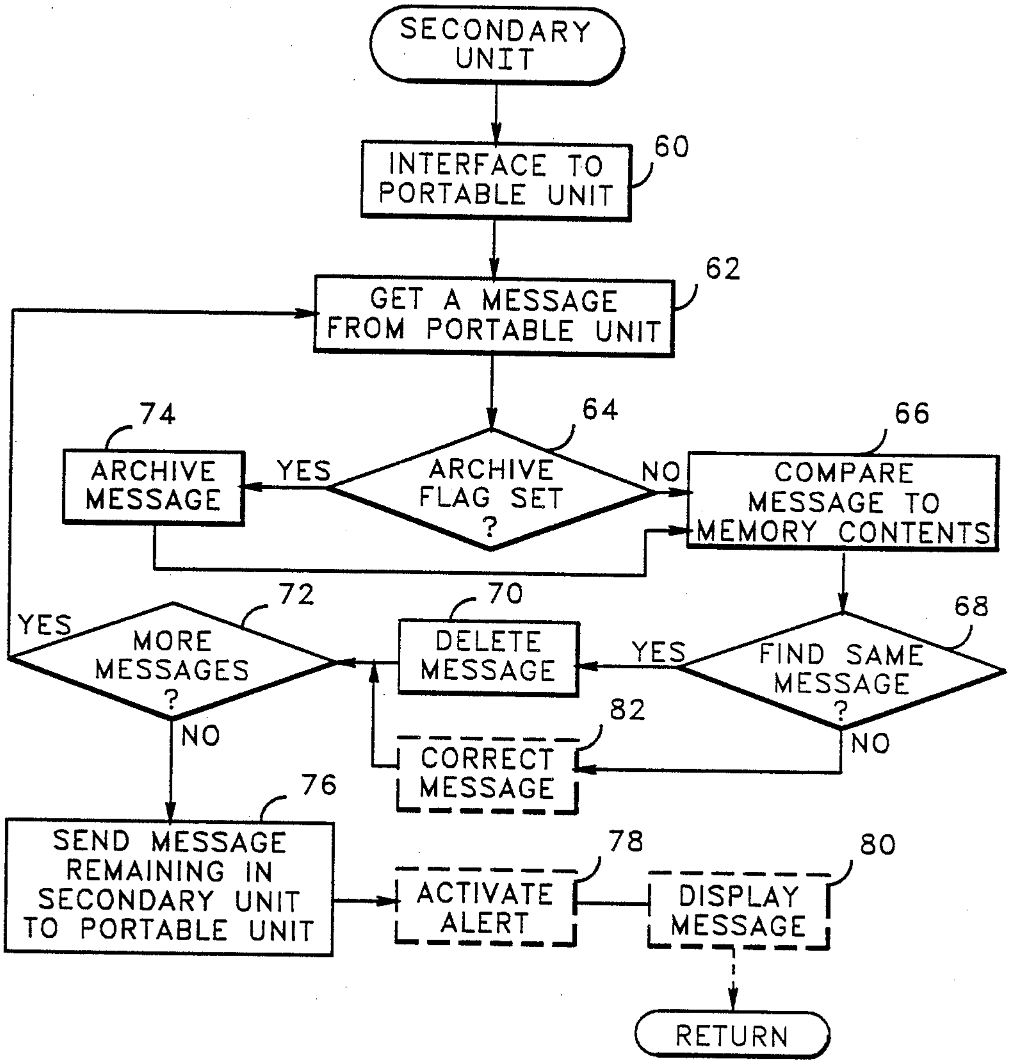
FIG. 4 is a flow diagram illustrating the steps executed by the stationary (secondary) receiving unit of FIG. 1.

Referring to FIG. 4, the steps executed by the secondary unit 10' after interfacing (as is shown at 24 of FIG. 1) to the portable unit 10 are illustrated. The secondary unit routine begins in step 60, where it is interfaced to the portable unit 10. Thereafter, a message is received from the portable unit (step 62). After receiving the message, the message is interrogated to determine whether the archive flag is set (decision 64). If so, the message is archived in archive portion of the memory 20' so as to provide an archival record that may be recalled at a later time. If the determination of decision 64 is that the archive flag is not set, or after archiving the message, the routine proceeds to step 66, where the message received from the portable unit is compared with the non archive portion of the memory 20'. That is, the present invention operates to compare each message (one at a time) from the portable unit with the messages received by the secondary unit 10'.

Accordingly, decision 68 determines whether the same (identical) message is found in the memory (20') of the secondary unit 10'. If so, the portable unit 10 has received the message previously and need not be made aware of its reception by the secondary unit. Accordingly, the secondary unit automatically deletes the message (step 70) and proceeds to decision 72. Decision 72 determines whether more messages are forthcoming from the portable unit, in which case the routine returns to step 62 to get the next message from the portable unit.

Assuming that the determination of decision 68 is that the message transferred from the portable unit does not match any message in the secondary unit, the present invention may optionally attempt to correct the message. If an identical match cannot be found between the message received from the portable unit and the memory contents (20') of the secondary unit 10', the memory contents can be further interrogated to determine whether the message received from the portable unit represents an erroneously received message. If so, the present invention may optionally operate (step 82) to merge a portion of the message from the portable unit with a portion of the message in the secondary unit in an attempt to provide the best approximation of a correct message. According to the invention, the preferred technique to accomplish the message combining (correcting) aspect of this invention is disclosed and described in U.S. Pat. application No. 000,927, filed Jan. 7, 1987, and assigned to the same assignee as the present invention which is hereby incorporated by reference. The corrected message will be forwarded to the portable unit as will be hereinafter described.

When decision 72 determines that there are no more messages to be retrieved from the portable unit, the routine proceeds to step 76, where the remaining messages in the secondary unit are sent to the portable unit 10. Thus according to the invention, as the secondary unit operates to delete messages received by both the portable unit and the secondary unit. Any messages remaining in the secondary unit will be those messages that the portable unit was unable to receive due to lack of memory, or being out-of-range from a transmitting station. Responsive of the step 76, the portable unit may operate to alert and display the received messages from the stationary (secondary) unit in a similar manner to messages received over-the-air. Optionally, the routine may proceed to step 78, where the secondary unit itself activates an alert (18') and displays the message (step 80) via the display 22' of the secondary unit 10'. In this way, the present invention operates to provide a redundant receiver having superior ability to receive messages that would otherwise be missed by the portable unit.

What is claimed is:

1. A radio frequency system, comprising:

a first selective call receiver for storing radio frequency messages received by said first selective call receiver in a first memory;

a second selective call receiver for storing radio frequency messages received by said second selective call receiver in a second memory; and comparing means for comparing the contents of the first and second memories.

2. A system according to 1, further comprising means for transferring messages contained only in said first memory to said second memory.

3. A system according to claim 1, further comprising means for deleting messages contained in said first memory and contained in said second memory from said first memory.

4. A system according to claim 1, wherein said first selective call receiver further includes means for selectively archiving in a third memory means selected ones of the messages found in said second memory.

5. A system according to claim 4, further comprising means for deleting from said second memory any message archived in said third memory.

6. A system according to claim 1, further comprising means for combining portions of a message in said first memory with portions of a message in said second memory to provide a combined message.

7. A system according to claim 1, wherein said second selective call receiver is constructed and arranged to be carried by a user.

8. A system according to claim 7, wherein said first selective call receiver is constructed and arranged to be mounted in vehicles and buildings.

9. A radio receiving system, comprising:

a first selection call receiver for storing radio frequency messages received by said first selective call receiver in a first memory;

a second selective call receiver for storing radio frequency messages received by said second selective call receiver in a second memory; and comparing means for comparing the contents of said first and second memories, for providing an indication if said contents are different, and for transferring that portion contained in said first memory and not contained in said second memory to said second memory.

10. A system according to 9, further comprising means for transferring messages contained only in said first memory to said second memory.

11. A system according to claim 10, further comprising means for deleting messages contained in said first memory and contained in said second memory from said first memory.

12. A system according to claim 9, further including means for selectively archiving in said first memory selected ones of the messages found in said second memory.

13. A method for receiving radio messages, comprising:

receiving at least one radio frequency message at a first selective call receiver;

storing said at least one radio frequency messages in a first memory;

receiving at least one radio frequency message at a second selective call receiver;

storing the at least one radio frequency message received by said second selective call receiver in a second memory;

comparing the contents of said first and second memories; and providing an indication of the result of said comparison.

14. A method according to claim 13, wherein the contents of said first and second memories represent messages received by said first and second receivers respectively and said method further comprising transferring messages contained in said first memory and not contained in said second memory to said second memory.

15. A method according to claim 14, further comprising deleting messages contained in said first memory and contained in said second memory from said first memory.

16. A method according to claim 15, further comprising selectively archiving in said first memory selected ones the messages contained in said second memory.

17. A method according to claim 16, further comprising automatically deleting from said second memory any message archived in said first memory.

18. A method according to claim 13, further comprising combining portions of a message in said first memory with portions of a message in said second memory to produce a combined message.

* * * * *